(12) United States Patent
Min et al.

(10) Patent No.: US 11,043,663 B2
(45) Date of Patent: Jun. 22, 2021

(54) METHOD FOR MANUFACTURING HIGH-LOADING ELECTRODE

(71) Applicant: LG CHEM, LTD., Seoul (KR)

(72) Inventors: Ji Won Min, Daejeon (KR); Seok Koo Kim, Daejeon (KR); Yong Jun Kim, Daejeon (KR); Janis Doelle, Daejeon (KR); Se Mi Park, Daejeon (KR)

(73) Assignee: LG Chem, Ltd.

( * ) Notice: Subject to any disclaimer, the term of this patent is extended or adjusted under 35 U.S.C. 154(b) by 271 days.

(21) Appl. No.: 16/337,353

(22) PCT Filed: Mar. 8, 2018

(86) PCT No.: PCT/KR2018/002738
§ 371 (c)(1),
(2) Date: Mar. 27, 2019

(87) PCT Pub. No.: WO2018/182195
PCT Pub. Date: Oct. 4, 2018

(65) Prior Publication Data
US 2020/0035995 A1   Jan. 30, 2020

(30) Foreign Application Priority Data
Mar. 30, 2017   (KR) .................. 10-2017-0040485

(51) Int. Cl.
*H01M 4/00* (2006.01)
*H01M 10/00* (2006.01)
(Continued)

(52) U.S. Cl.
CPC ......... *H01M 4/139* (2013.01); *H01M 4/0402* (2013.01); *H01M 10/0525* (2013.01); *H01M 50/20* (2021.01)

(58) Field of Classification Search
None
See application file for complete search history.

(56) References Cited

U.S. PATENT DOCUMENTS

2011/0287303 A1*  11/2011  Roh .................... H01M 4/0435
                                                                         429/163
2013/0170100 A1*  7/2013  Lee ........................ H01G 11/38
                                                                         361/502

FOREIGN PATENT DOCUMENTS

JP         5636965 B2    12/2014
JP         5787750 B2     9/2015
(Continued)

OTHER PUBLICATIONS

International Search Report for PCT/KR2018/002738 (PCT/ISA/210) dated Aug. 1, 2018.

*Primary Examiner* — Jacob T Minskey
*Assistant Examiner* — Matthew Hoover
(74) *Attorney, Agent, or Firm* — Lerner, David, Littenberg, Krumholz & Mentlik, LLP

(57) ABSTRACT

A method of manufacturing a high loading electrode, which prevents the phenomenon of the binder being lifted, does not cause drying of the electrode slurry, and does not cause damage of the electrode layer and reduction of the electrode strength at the corners in the punching is provided. The method of manufacturing the high loading electrode includes applying an electrode slurry on a release film to thereby produce an electrode layer having the release film attached thereto, punching the electrode layer having the release film attached thereto to provide a plurality of punched electrode layers, each punched electrode layer having a size of a unit electrode, separating and removing the release film from the punched electrode layers, and stacking and rolling at least two punched electrode layers on a current collector.

10 Claims, 3 Drawing Sheets

(51) Int. Cl.
   *H01M 50/00*      (2021.01)
   *H01M 4/139*      (2010.01)
   *H01M 4/04*       (2006.01)
   *H01M 10/0525*    (2010.01)
   *H01M 50/20*      (2021.01)

(56) References Cited

FOREIGN PATENT DOCUMENTS

| | | |
|---|---|---|
| KR | 10-0319096 B1 | 12/2001 |
| KR | 10-1147241 B1 | 5/2012 |
| KR | 10-1214727 B1 | 12/2012 |
| KR | 10-2015-0063340 A | 6/2015 |
| KR | 10-2015-0071453 A | 6/2015 |
| KR | 10-2015-0128279 A | 11/2015 |
| KR | 10-2016-0050255 A | 5/2016 |
| KR | 10-1684276 B1 | 12/2016 |
| KR | 10-2017-0031439 A | 3/2017 |
| WO | WO 2008/093020 A1 | 8/2008 |

\* cited by examiner

METHOD FOR MANUFACTURING HIGH-LOADING ELECTRODE

TECHNICAL FIELD

The present disclosure relates to a method for manufacturing a high loading electrode, and more particularly, to a method for manufacturing a high loading electrode by applying an electrode slurry on a release film to thereby produce an electrode layer having the release film attached thereto, punching the electrode layer having the release film attached thereto to provide a plurality of punched electrode layers, each punched electrode layer having a size of a unit electrode, separating and removing the release film from the punched electrode layers, and stacking and rolling at least two punched electrode layers on a current collector.

RELATED ART

As technologies of mobile devices are developed and the demand for the mobile devices increases, the demand for secondary batteries as energy sources has rapidly increased. In recent years, secondary batteries are currently used for electric vehicles (EV) and hybrid electric vehicles (HEV) as power sources, and particularly there is a high demand for lithium secondary batteries having high energy density, high discharge voltage and output stability.

Particularly, a lithium secondary battery used as a power source of an electric vehicle (EV) or a hybrid electric vehicle (HEV) requires a characteristic capable of exhibiting a high output in a short time with a high energy density.

Generally, a lithium secondary battery is manufactured by using a material capable of inserting and desorbing lithium ions as a negative electrode and a positive electrode, filling an organic electrolytic solution or a polymer electrolytic solution between the positive electrode and the negative electrode, and electrical energy is generated by an oxidation and reduction reaction at the time of inserting and desorbing lithium ions in the positive electrode and the negative electrode.

At this time, the negative electrode and the positive electrode include an electrode layer on the current collector of each electrode. For example, a slurry is prepared by mixing and stirring a binder and a solvent, and a conductive agent and a dispersant, if necessary, and then the slurry can be coated on the current collector of a metal material, compressed and then dried to thereby produce an electrode.

Such conventional electrodes are manufactured by coating the electrode slurry once on each current collector. Conventional electrodes are manufactured by applying a slurry in which an electrode active material, a binder, and a conductive material are appropriately mixed, onto a positive electrode/negative electrode current collector, followed by a heat treatment process. That is, an electrode layer including a binder and a conductive material is formed on a positive electrode/negative electrode current collector.

In this structure, if the thickness of the electrode layer is increased in order to increase the capacity of the battery, the lithium ion transfer path becomes long, so that intercalation/deintercalation of lithium into the active material far from the current collector occurs, the movement of electrons through the current collector is restricted. Also, since the binder contained in the electrode layer is relatively light, it is not uniformly dispersed in the electrode layer, and the phenomenon of floating on the surface occurs. The thicker the electrode layer, the greater the separation, and thus the deterioration of the cycle characteristics of the battery and the reduction of the lifetime of the battery due to the separation of the current collector and the active material, which is generated in the process of charge/discharge, cannot be avoided.

In addition, when a large amount of slurry is placed on the current collector and dried, a part of the slurry is not dried, or if it is hit, there arises problems such as damage of the electrode layer at the corners and decrease of electrode strength due to increase in thickness of the electrode layer.

Therefore, there is a need for a new structure of electrode fabrication method that can solve the above problems in order to manufacture a high loading electrode with improved energy density.

DISCLOSURE

Technical Problem

It is an object of the present disclosure to provide a high loading electrode which prevents the phenomenon of the binder being lifted, does not cause drying of the electrode slurry, and does not cause damage of the electrode layer and reduction of the electrode strength at the corners in the punching.

Technical Solution

According to an aspect of the present disclosure, there is provided a method of manufacturing a high loading electrode, the method including applying an electrode slurry on a release film to thereby produce an electrode layer having the release film attached thereto, punching the electrode layer having the release film attached thereto to provide a plurality of punched electrode layers, each punched electrode layer having a size of a unit electrode, separating and removing the release film from the punched electrode layers, and stacking and rolling at least two punched electrode layers on a current collector.

The high loading electrode may include two or more kinds of punched electrode layers made of different materials.

The high loading electrode may include two or more punched electrode layers having different thicknesses.

The thickness of each punched electrode layer may be between 40 to 150 μm.

According to another aspect of the present disclosure, there is provided a high loading electrode manufactured by the above-described method.

According to yet another aspect of the present disclosure, there is provided a secondary battery include the above-described high loading electrode.

The battery may be any one selected from a lithium ion battery, a lithium polymer battery and a lithium ion polymer battery.

According to further another aspect of the present disclosure, there is provided a battery pack including at least one above-described secondary battery.

According to further another aspect of the present disclosure, there is provided a device including the above-described battery pack as a power source.

The device may be any one selected from a cellular phone, a portable computer, a smart phone, a smart pad, a netbook, a wearable electronic device, a LEV (Light Electronic Vehicle), an electric vehicle, a plug-in hybrid electric vehicle, and a power storage device.

Effect of the Invention

According to the present disclosure, a high loading electrode is manufacture by applying an electrode slurry on a release film to thereby produce an electrode layer having the release film attached thereto, punching the electrode layer having the release film attached thereto to provide a plurality of punched electrode layers, each punched electrode layer having a size of a unit electrode, separating and removing the release film from the punched electrode layers, and stacking and rolling at least two punched electrode layers on a current collector, to thereby prevent the phenomenon of the binder being lifted, not cause drying of the electrode slurry, and not cause damage of the electrode layer and reduction of the electrode strength at the corners in the punching.

DETAILED DESCRIPTION OF THE PREFERRED EMBODIMENTS

Figure 1:
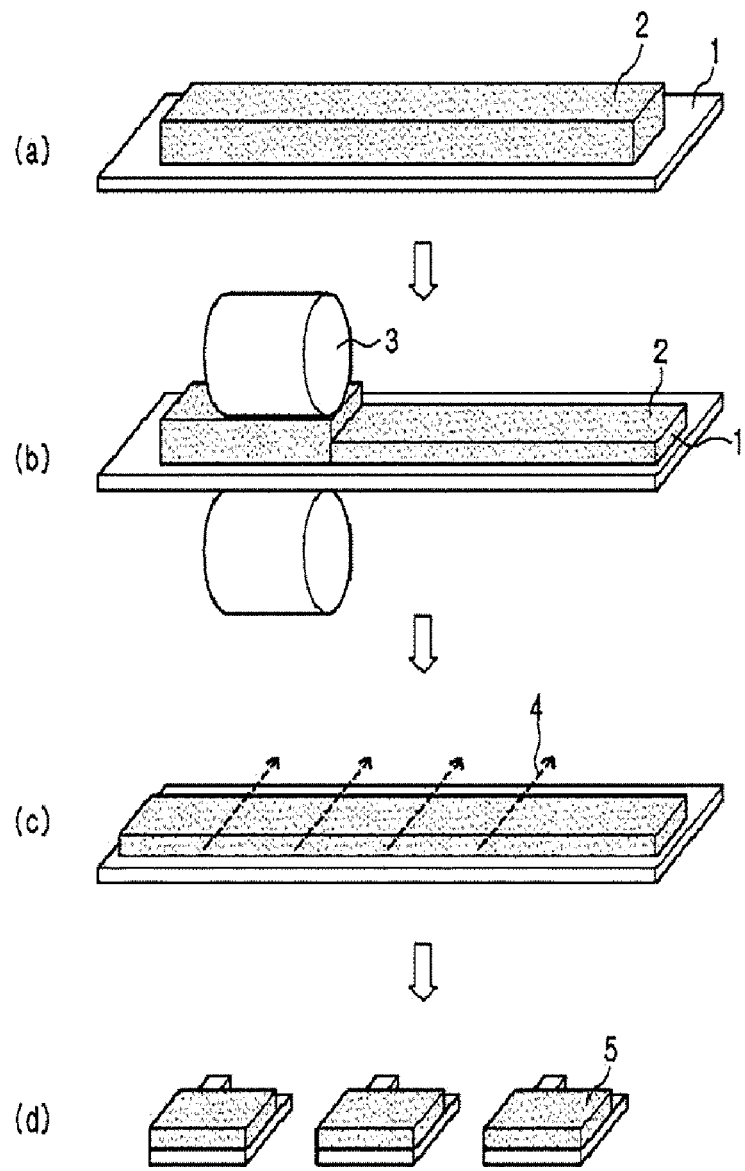
FIG. 1 shows a method of making an electrode according to the conventional art.

Hereinafter, preferred embodiments of the present disclosure will be described in detail. It should be noted that the present disclosure is not limited to the scope of the present disclosure, but is merely an example, and various modifications are possible without departing from the technical gist of the present disclosure.

The method of making high loading electrodes according to the present disclosure includes making an electrode layer having a release film attached thereon by applying an electrode slurry on the release film, punching the electrode layer into parts of a size of a unit electrode, and raising the electrode layer to a second or higher floor on a current collector to be rolled after separating the release film from the punched electrode layer and removing the release film.

Any release film capable of being separated after applying and drying the electrode slurry 12 may be used as the release film 11. For example, a PET film, a PE film, an acrylic film, etc. may be used, and silicon or fluorine coating on the surface may be used to improve the release property.

The electrode layer 15 having the release film attached thereon is made by applying the electrode slurry on the release film 11. In the case of the positive electrode, the electrode slurry 12 is made by mixing a binder and conductive agents with electrode active materials, and if necessary, a filler may be further added to the mixture. In the case of the negative electrode, the filler may be further added to a negative electrode material as necessary to make the electrode slurry 12.

The positive electrode active material according to the present disclosure may be used together with a compound which uses lithium intercalation material as the main element such as layered compounds such as lithium cobalt oxide ($LiCoO_2$) and lithium nickel oxide ($LiNiO_2$), and compounds substituted with one or more transition metals; lithium manganese oxide ($LiMnO_2$) such as $Li_{1+x}Mn_{2-x}O_4$ (here, x is between 0 and 0.33), $LiMnO_3$, $LiMn_2O_3$, $LiMnO_2$, etc.; lithium copper oxide ($Li_2CuO_2$); Vanadium oxide such as $LiV_3O_8$, $LiFe_3O_4$, $V_2O_5$, $Cu_2V_2O_7$; lithiated nickel oxide expressed as chemical formula $LiNi_{1-x}M_xO_2$ (here, M=Co, Mn, Al, Cu, Fe, Mg, B or Ga and, x=between 0.01 and 0.3); lithium manganese composite oxide expressed as chemical formula $LiMn_{2-x}M_xO_2$ (here, M=Co, Ni, Fe, Cr, Zn or Ta, x=between 0.01 and 0.1) or $Li_2Mn_3MO_8$ (here, M=Fe, Co, Ni, Cu or Zn); $LiMn_2O_4$ in which part of lithium is substituted with alkaline earth metal ions; disulfide compound; or composite oxide formed by combination thereof $Fe_2(MoO_4)_3$.

The conductive agent is usually added in an amount of 1 to 50 wt % based on the total weight of the mixture including the positive electrode active material. Such a conductive agent is not particularly limited as long as it has electrical conductivity without causing a chemical change in the battery, and examples thereof include graphite such as natural graphite and artificial graphite; carbon black such as carbon black, acetylene black, Ketjenblack, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive oxides such as titanium oxide; conductive materials such as polyphenylene derivatives and the like.

The binder is a component which assists in bonding of the active material and the conductive material and binding with the current collector 1, and is usually added in an amount of 1 to 50 wt % based on the total weight of the mixture containing the positive electrode active material. Examples of such binders include polyvinylidene fluoride, polyvinyl alcohol, carboxy methyl cellulose (CMC), starch, hydroxyl propyl cellulose, regenerated cellulose, polyvinyl pyrrolidone, tetrafluoro ethylene, polyethylene, Polypropylene, ethylene-propylene-diene terpolymer (EPDM), sulfonated EPDM, styrene butylene rubber, fluorine rubber, various copolymers and the like.

The filler is optionally used as a component for inhibiting expansion of a positive electrode, and is not particularly limited as long as it is a fibrous material without causing a chemical change in the battery. Examples of the filler include olefin polymers such as polyethylene and polypropylene; fibrous materials such as glass fibers and carbon fibers.

The negative electrode material may include amorphous carbon or crystalline carbon, specifically carbon such as non-graphitized carbon or graphite carbon; $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, group 2, group 3 elements of the periodic table, halogen; Metal complex oxides such as $0 < x \leq 1$; $1 \leq y \leq 3$; $1 \leq z \leq 8$); Lithium metal; Lithium alloy; Silicon-based alloys; Tin alloy; Oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$; Conductive polymer such as polyacetylene; Li—Co—Ni group material.

The electrode slurry 12 is applied on the release film 11 and is then coated so as to form the electrode layer 15, and the thickness of the electrode layer 15 is preferably between 40 μm and 150 μm. If the thickness is less than 40 μm, the electrode layer 15 may not be easily separated from the release film 11, and if the thickness is greater than 150 μm, a gap may be generated from the binder, which is not fitting to the high loading electrodes.

FIG. 1 shows a method of making an electrode according to the conventional art. In the past, (a) an electrode slurry 2 on the electrode current collector 1 is stacked thick, (b) is rolled with a roller 3, and (c) is then punched 4 so as to make a one-story unit electrode. However, in this case, a single electrode layer becomes thick, and thus when the electrode layer is dried, the electrode layer may be only partly dried or may not be dried and when the electrode layer is punched, the edge of the electrode may be damaged. Additionally, a gap may be generated from the binder, which is not fitting to the high loading.

Figure 2:
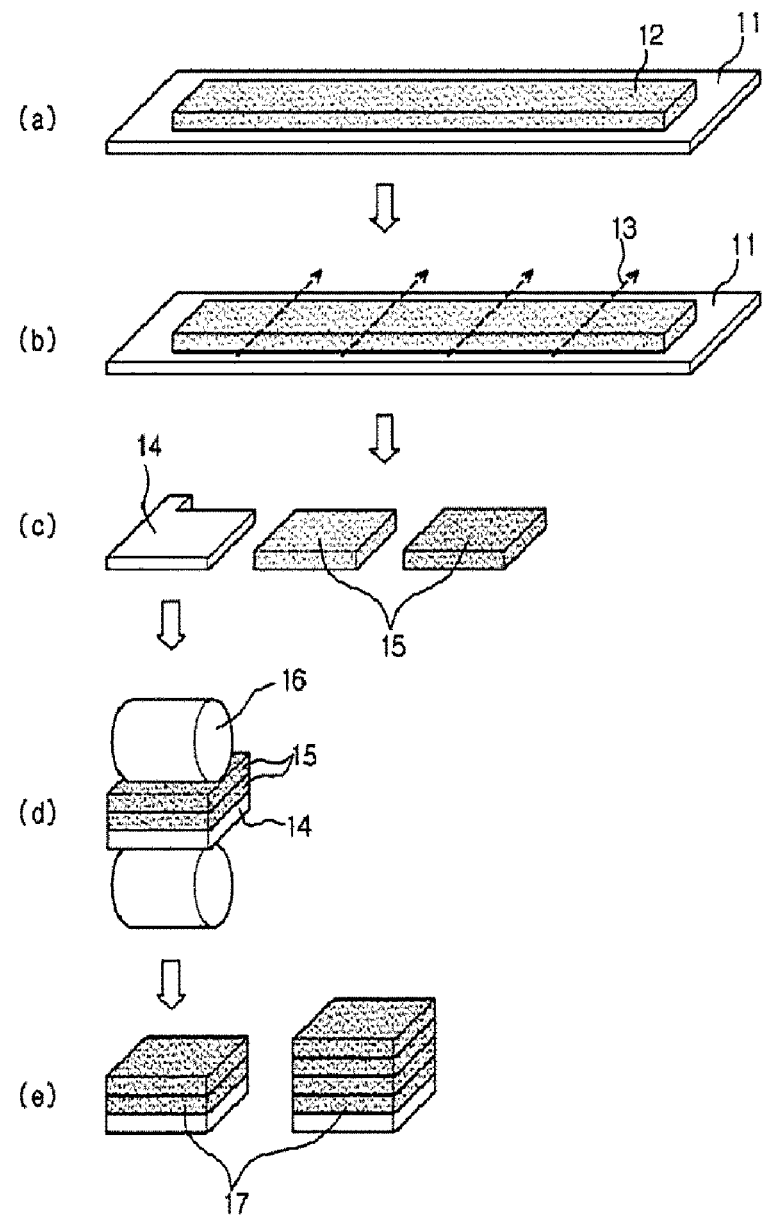
FIG. 2 shows a method of making a single-ingredient multilayer electrode according to the present disclosure.

FIG. 2 shows a method of making a single-ingredient multilayer electrode 17 according to the present disclosure. In this method, (a) the electrode slurry 12 is applied on the release film 11 and then (b) punched 13 in the unit electrode sizes. Next, (c) the punched electrode layer 15 is stacked as two or more layers on the electrode current collector, and (d) is then rolled by a roller 16 so as to make a single-ingredient multilayer electrode 17. According to the present disclosure, the electrode slurry 12 is applied thin on the release film 11, and thus when the electrode layer is dried, the problem that the electrode layer is only partly dried or is not dried does not happen.

The coated electrode layer 15 is punched 13 in the unit electrode size, and since the thickness of the electrode layer is merely between about 40 and 150 μm, the edge of the electrode is not damaged when punched.

The release film 11 is removed from the punched 13 electrode layer 15 and the electrode layer 15 is stacked as two or more layers on the electrode current collector 14 and is rolled 16 so as to become a unit electrode. Since one electrode layer is thin, the loading is low, but if a unit electrode is made by being made as two or more layers and then rolled, a high loading electrode may be made. One electrode layer 15 may be made to have different thicknesses or different ingredients. Hence, the electrode layer of two or more kinds of ingredients may be stacked as two or more layers and is then rolled so as to make a high loading electrode of a heterogeneous-ingredient multilayer electrode 18, and a high loading electrode of a single-ingredient multilayer electrode 17 may be made by stacking two different thicknesses of electrode layers as two or more layers and rolling the electrode layers. Further, a high loading electrode may be made by stacking the electrode layers which are different in both the thickness and the ingredients.

Figure 3:
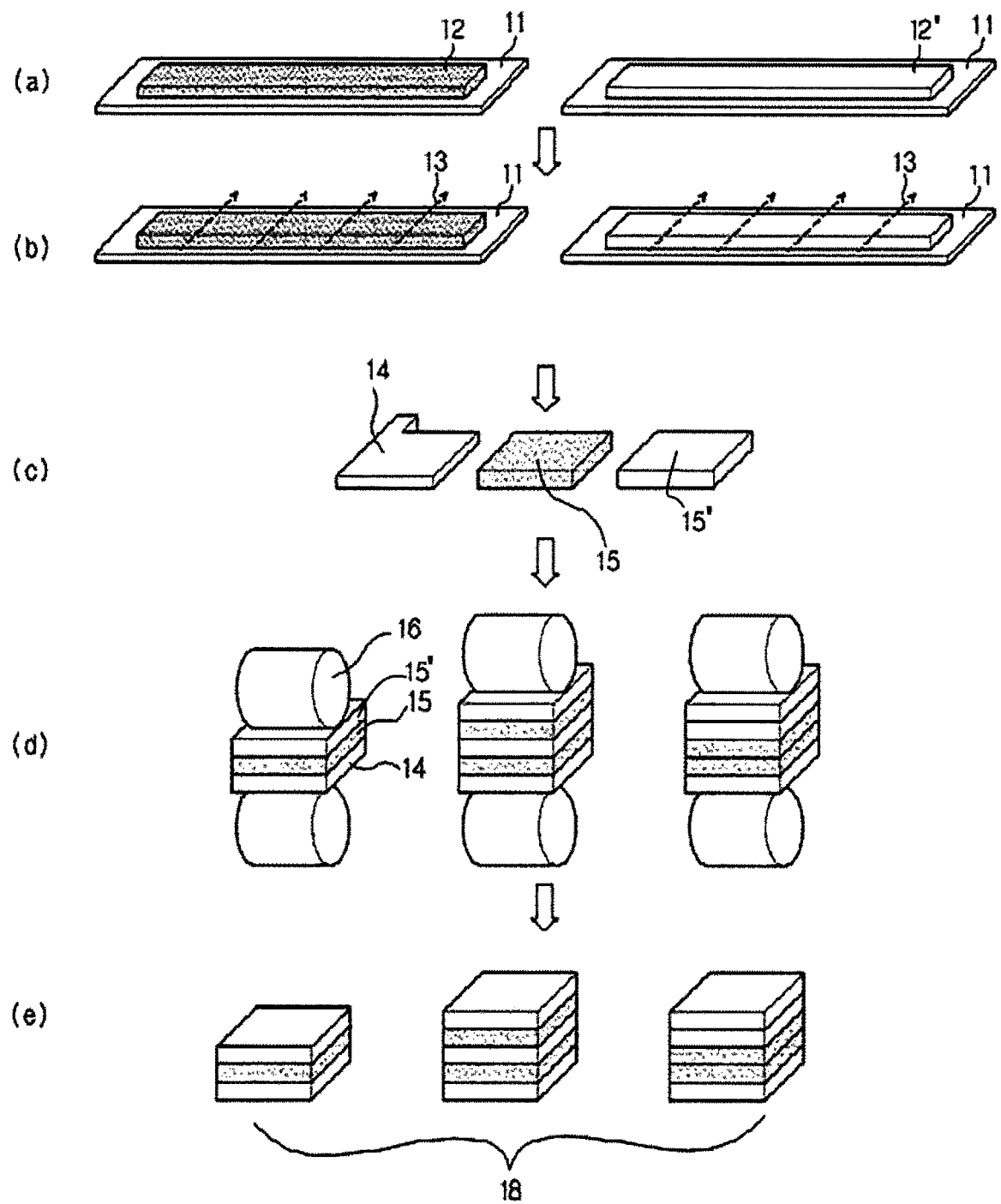
FIG. 3 shows a method of making a heterogeneous-ingredient multilayer electrode according to the present disclosure.

FIG. 3 shows a method of making a heterogeneous-element multilayer electrode 18 according to the present disclosure. In this method, (a) electrode slurries 12 and 12' of heterogeneous ingredients are respectively applied on the release film 11 to be coated, and (b) the electrode layers 15 and 15' are punched 13 to be unit electrode sizes. Next, (c) the punched electrode layers 15 and 15' are stacked as two or more layers on the electrode current collector 14 and (d) are rolled by the roller 16 so as to (e) make a heterogeneous-ingredient multilayer electrode 18.

In comparison to the conventional art of making a high loading electrode with a single electrode layer, the method of making a high loading electrode according to the present disclosure does not generate the problem that the electrode slurry 12 is only partly dried or not dried and the problem that the edge of the electrode is damaged when punched, and the phenomenon that a gap is generated from the binder may be prevented. The method of making an electrode according to the present disclosure may be applicable to both the positive electrode and the negative electrode.

The electrode layer 15 is made by applying the electrode slurry 12 and the unit electrode is made by punching 13 the electrode layer 15 and stacking the electrode layer 15 as two or more layers, and thus various kinds of electrodes can be designed as necessary. The electrode may be designed according to desired performances such as the stability of the battery and the cycle lifespan. Furthermore, the number of electrode layers 15 stacked on the current collector 14 is increased to easily make a high loading electrode, and various loadings of electrodes may be made from low loading electrodes to high loading electrodes according to the number of the electrode layers 15. Furthermore, the problem of the strength reduction of the electrode may less occur compared to the time when the electrode is made by a single electrode layer.

Meanwhile, the present disclosure is also featured in providing a secondary battery including a high loading battery made by the above method.

The secondary battery according to the present disclosure includes an electrode assembly which is made by lamination of electrodes of different polarities in a state that is separated by a separator, and the electrode assembly includes a positive electrode including positive electrode active materials, a negative electrode including negative electrode active materials, and a separator.

Specifically, the positive electrode, for example, is made by applying the mixture of the positive electrode active materials, a conductive agent and a binder on the positive electrode current collector 1 and then drying the positive electrode current collector 1, and a filler may be added to the mixture.

The positive electrode current collector 1 is generally made to have a thickness of 3 to 500 μm. The positive electrode current collector 1 is not particularly limited as long as it has high conductivity without causing chemical changes in the battery. Examples of the positive electrode current collector 1 include stainless steel, aluminum, nickel, titanium, calcined carbon, and stainless steel or aluminum of which the surface has been treated with carbon, nickel, titanium, silver, or the like. The current collector 1 may have fine irregularities on the surface thereof to increase the adhesion of the positive electrode active material, and various forms such as a film, a sheet, a foil, a net, a porous body, a foam, and a nonwoven fabric are possible.

The negative electrode may be formed by applying a negative electrode material on the negative electrode current collector 1 and drying the negative electrode material. If necessary, the negative electrode may further include the above-described components.

The negative electrode current collector 1 is generally made to have a thickness of 3 to 500 μm. The negative electrode current collector 1 is not particularly limited as long as it has conductivity without causing chemical changes in the battery, and examples thereof include copper, stainless steel, aluminum, nickel, titanium, calcined carbon, and copper or stainless steel of which the surface has been treated with carbon, nickel, titanium, or silver, and an aluminum-cadmium alloy. In addition, like the positive electrode current collector 1, fine unevenness can be formed on the surface to enhance the bonding force of the negative electrode active material, and it can be used in various forms such as films, sheets, foils, nets, porous bodies, foams, etc.

Both a polyolefin-based separator commonly known as a separator for insulating the electrodes between the positive electrode and the negative electrode, and a composite separator having an organic and inorganic composite layer formed on the olefin-based substrate can be used and are not particularly limited.

The electrolyte according to the present disclosure is a non-aqueous electrolyte containing a lithium salt, which is composed of a nonaqueous electrolyte and lithium. As the non-aqueous electrolyte, a non-aqueous electrolyte, a solid electrolyte, an inorganic solid electrolyte and the like are used.

Examples of the nonaqueous electrolyte include N-methyl-2-pyrrolidinone, propylene carbonate, ethylene carbonate, butylene carbonate, dimethyl carbonate, diethyl carbonate, gamma-butylolactone, 1,2-dimethoxyethane, tetrahydroxyfranc, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl pyrophosphate, ethyl propionate and the like.

Examples of the organic solid electrolyte include polymers such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, and an ionic dissociation group.

Examples of the inorganic solid electrolyte include Li nitrides such as $Li_3N$, $LiI$, $Li_5NI_2$, $Li_3N$—$LiI$—$LiOH$, $LiSiO_4$, $Li_2SiS_3$, $Li_4SiO_4$, $Li_4SiO_4$—$LiI$—$LiOH$, $Li_3PO_4$—$Li_2S$—$SiS_2$, halides, sulfates, etc.

The lithium salt is a substance that is soluble in the non-aqueous electrolyte, and examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylate lithium, lithium 4-phenylborate, imide and the like.

For the purpose of improving charge/discharge characteristics and flame retardancy, pyridine, triethylphosphite, triethanolamine, cyclic ethers, ethylenediamine, glyme, hexahydrate triamide, nitrobenzene derivatives, sulfur, quinone imine dyes, N-substituted oxazolidinones, N, N-substituted imidazolidines, ethylene glycol dialkyl ether, ammonium salt, pyrrole, 2-methoxyethanol, aluminum trichloride, etc. may be added to the non-aqueous electrolyte. In some cases, a halogen-containing solvent such as carbon tetrachloride or ethylene trifluoride may be further added to impart nonflammability, or a carbon dioxide gas may be further added to improve high temperature storage characteristics.

The battery is any one selected from a lithium ion battery, a lithium polymer battery, and a lithium ion polymer battery. This is a classification according to the characteristics of the electrolytic solution. The positive and negative electrodes and the electrolytes are as described above.

The present disclosure may provide a battery back including one or more secondary batteries.

Further, a device including the battery pack as the power source may also be provided, and thus the device may be one selected from a group consisting of a mobile phone, a portable computer, a smart phone, a smart pad, a Network, a wearable electronic device, a light electronic vehicle (LEV), an electric car, a hybrid electric car, a plug-in hybrid electric car and a power storage device.

The present disclosure will be described in detail through the following embodiments. However, the following embodiments and experimental examples are explained to illustrate the present disclosure, and the scope of the present disclosure is not limited to these embodiments and experimental examples.

Embodiment 1

$LiNi_{0.55}Mn_{0.30}Co_{0.15}O_2$ (positive electrode active material), denka black (conductive agent), and polyvinylidene fluoride (PVDF) (binder) have been mixed with the weight ratio of 96:2:2, then NMP (N-methyl pyrrolidone) was added to make a slurry. The slurry was applied on the PET film to make an electrode layer. The thickness of the electrode layer was set to 120 um. The electrode layer was punched with the unit electrode size so as to remove the release film and was then stacked on the aluminum foil current collector as two floors and was rolled to make n positive electrode.

An electrode assembly was made using the made positive electrode, then the electrode assembly was put in an aluminum pouch and was connected to an electrode lead. Thereafter, a carbonate-group composite solution containing 1M $LiPF_6$ was injected into electrolyte and then sealed to assemble a lithium secondary battery.

Embodiments 2~8

The positive electrode and lithium secondary battery was made with the same method as in the embodiment 1 except for having the thickness and the number of layers shown in Table 1 below.

Embodiment 9

$LiNi_{0.55}Mn_{0.30}Co_{0.15}O_2$ (positive electrode active material), denka black (conductive agent), and polyvinylidene fluoride (PVDF) (binder) have been mixed with the weight ratio of 96:2:2, then NMP (N-methyl pyrrolidone) was added to make a slurry. The slurry was applied on the PET film to make a first electrode layer. The thickness of the first electrode layer was set to 120 um.

$LiCoO_2$ (positive electrode active material), denka black (conductive agent), and polyvinylidene fluoride (PVDF) (binder) have been mixed with the weight ratio of 80:5:15, then NMP (N-methyl pyrrolidone) was added to make a slurry. The slurry was applied on the PET film to make a secondary electrode layer. The thickness of the second electrode layer was set to 120 um.

The first electrode layer and the second electrode layer were punched with the unit electrode size to remove the release film and alternately stacked on the aluminum foil current collector to make a total of two floors so as to be rolled to make an electrode.

An electrode assembly was made using the made positive electrode, which is put in an aluminum pouch and was connected the electrode lead, then the carbonate-group composite solution containing 1M $LiPF_6$ was injected into electrolyte and is sealed to assemble a lithium secondary battery.

Embodiments 10~13

An positive electrode and lithium secondary battery was made by the same method as in the embodiment 9 except for having the thickness and the number of layers shown in Table 1 below.

Comparative Examples 1 to 5

$LiNi_{0.55}Mn_{0.30}Co_{0.15}O_2$ (positive electrode active material), denka black (conductive material), and polyvinylidene fluoride (PVDF) (binder) have been mixed with the weight ratio of 96:2:2, then NMP (N-methyl pyrrolidone) was added to make a slurry. The slurry was applied on the aluminum foil current collector PET film so as to be rolled and punched to make an positive electrode. In the electrode, the thickness of the electrode layer is shown in Table 1 below.

The electrode assembly was made using the made positive electrode and is then put in the aluminum pouch and is connected to the electrode lead, then the carbonate-group composite solution containing 1M $LiPF_6$ was injected into electrolyte and was sealed to assemble a lithium secondary battery.

The case that there is a crack or damage in the edge of the electrode or the surface of the electrode in the process of making or punching an electrode layer is indicated as "O" and the case that there is crack or damage is indicated as "X" in Table 1 below.

As shown in the above Table 1, no crack or edge damage was found in the electrodes of embodiments 1 to 13 according to the present disclosure, but a crack and edge damage was found in the electrode of comparative examples 1 to 5 of the prior art.

Further, experiments on battery capacity, rate characteristic and cycle characteristic were performed for lithium

TABLE 1

| | Ingredients of electrode layer | No. of electrode layers | Thickness of electrode layer | Thickness of total electrode layer | Crack | Damage on edge |
|---|---|---|---|---|---|---|
| Embodiment 1 | Single | 2 | 120<br>120 | 240 | X | X |
| Embodiment 2 | Single | 3 | 80<br>80<br>80 | 240 | X | X |
| Embodiment 3 | Single | 4 | 60<br>60<br>60<br>60 | 240 | X | X |
| Embodiment 4 | Single | 5 | 48<br>48<br>48<br>48<br>48 | 240 | X | X |
| Embodiment 5 | Single | 6 | 40<br>40<br>40<br>40<br>40<br>40 | 240 | X | X |
| Embodiment 6 | Single | 3 | 100<br>40<br>100 | 240 | X | X |
| Embodiment 7 | Single | 4 | 80<br>40<br>80<br>40 | 240 | X | X |
| Embodiment 8 | Single | 5 | 40<br>60<br>40<br>60<br>40 | 240 | X | X |
| Embodiment 9 | Heterogeneous | 2 | 120<br>120 | 240 | X | X |
| Embodiment 10 | Heterogeneous | 3 | 80<br>80<br>80 | 240 | X | X |
| Embodiment 11 | Heterogeneous | 4 | 60<br>60<br>60<br>60 | 240 | X | X |
| Embodiment 12 | Heterogeneous | 5 | 48<br>48<br>48<br>48<br>48 | 240 | X | X |
| Embodiment 13 | Heterogeneous | 6 | 40<br>40<br>40<br>40<br>40<br>40 | 240 | X | X |
| Comparative example 1 | Single | 1 | 240 | 240 | O | O |
| Comparative example 2 | Single | 1 | 200 | 200 | O | O |
| Comparative example 3 | Single | 1 | 160 | 160 | O | X |
| Comparative example 4 | Single | 1 | 120 | 120 | X | X |
| Comparative example 5 | Single | 1 | 280 | 280 | O | O | secondary batteries made in the embodiments 1 to 13 and comparative examples 1 to 5 and the results are shown in Table 2 below.

TABLE 2

|  | Capacity (mAh) | Rate (1 C/0.2 C) | Cycle characteristic (%, 300 times capacity maintenance rate) |
| --- | --- | --- | --- |
| Embodiment 1 | 2,960 | 0.78 | 84 |
| Embodiment 2 | 2,980 | 0.80 | 82 |
| Embodiment 3 | 3,000 | 0.82 | 80 |
| Embodiment 4 | 3,020 | 0.84 | 78 |
| Embodiment 5 | 2,960 | 0.86 | 76 |
| Embodiment 6 | 2,980 | 0.78 | 84 |
| Embodiment 7 | 3,000 | 0.80 | 82 |
| Embodiment 8 | 3,020 | 0.82 | 80 |
| Embodiment 9 | 2,960 | 0.78 | 84 |
| Embodiment 10 | 2,980 | 0.80 | 82 |
| Embodiment 11 | 3,000 | 0.82 | 80 |
| Embodiment 12 | 3,020 | 0.84 | 78 |
| Embodiment 13 | 2,980 | 0.86 | 76 |
| Comparative example 1 | 2,800 | 0.68 | 76 |
| Comparative example 2 | 2,820 | 0.70 | 74 |
| Comparative example 3 | 2,840 | 0.72 | 72 |
| Comparative example 4 | 2,860 | 0.74 | 70 |
| Comparative example 5 | 2,800 | 0.68 | 76 |

As shown in the above Table 2, battery capacity, rate characteristic and cycle characteristic of the battery of embodiments 1 to 13 according to the present disclosure were improved compared to the comparative examples 1 to 5 of the prior art.

In the above, the present disclosure was explained by the limited embodiments and drawings, but the present disclosure it not limited thereto and may be amended and modified by one of ordinary skill in the art in various ways within the technical idea of the present disclosure and the scope of the claims below.

DESCRIPTION OF SYMBOLS

| 1: Electrode current collector | 2: Electrode slurry |
| --- | --- |
| 3: Roller | 4: Punching |
| 5: Single layer electrode | |
| 11: Release film | 12: Electrode slurry |
| 13: Punching | 14: Electrode current collector |
| 15: Electrode Layer | 16: Roller |
| 17: Single-ingredient multilayer electrode | |
| 18: Heterogeneous-ingredient multilayer electrode | |

The invention claimed is:

1. A method of manufacturing a high loading electrode, the method comprising:
    applying an electrode slurry on a release film to thereby produce an electrode layer having the release film attached thereto;
    punching the electrode layer having the release film attached thereto to provide a plurality of punched electrode layers, each punched electrode layer having a size of a unit electrode;
    separating and removing the release film from the punched electrode layers; and
    stacking and rolling at least two punched electrode layers on a current collector.

2. The method of claim 1, wherein the high loading electrode includes two or more kinds of punched electrode layers made of different materials.

3. The method of claim 1, wherein the high loading electrode includes two or more punched electrode layers having different thicknesses.

4. The method of claim 1, wherein the thickness of each punched electrode layer is between 40 to 150 μm.

5. A high loading electrode manufactured by the method of claim 1.

6. A secondary battery comprising the high loading electrode according to claim 5.

7. The secondary battery of claim 6, wherein the battery is any one selected from a lithium ion battery, a lithium polymer battery and a lithium ion polymer battery.

8. A battery pack comprising at least one secondary battery of claim 7.

9. A device comprising the battery pack of claim 8 as a power source.

10. The device of claim 9, wherein the device is any one selected from a cellular phone, a portable computer, a smart phone, a smart pad, a netbook, a wearable electronic device, a LEV (Light Electronic Vehicle), an electric vehicle, a plug-in hybrid electric vehicle, and a power storage device.

* * * * *